US007472238B1

(12) United States Patent
Gokhale et al.

(10) Patent No.: US 7,472,238 B1
(45) Date of Patent: Dec. 30, 2008

(54) SYSTEMS AND METHODS FOR RECOVERING ELECTRONIC INFORMATION FROM A STORAGE MEDIUM

(75) Inventors: Parag Gokhale, Ocean, NJ (US); Jun Lu, Ocean, NJ (US); Yanhui Lu, Chester Springs, PA (US); Yu Wang, Edison, NJ (US); Rajiv Kottomtharayil, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 122 days.

(21) Appl. No.: 11/269,515

(22) Filed: Nov. 7, 2005

Related U.S. Application Data (60) Provisional application No. 60/626,076, filed on Nov. 8, 2004, provisional application No. 60/625,746, filed on Nov. 5, 2004.

(51) Int. Cl.
 *G06F 12/02* (2006.01)
(52) U.S. Cl. .................. 711/159; 711/112; 711/161; 711/162
(58) Field of Classification Search .................. 711/159
 See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |

(Continued)

FOREIGN PATENT DOCUMENTS

EP        0259912        3/1988

(Continued)

OTHER PUBLICATIONS

Recycle Bin (Windows), Aug. 2007, Wikipedia, pp. 1-3.*

(Continued)

*Primary Examiner*—Hetul Patel
(74) *Attorney, Agent, or Firm*—Perkins Coie LLP (57) ABSTRACT

In one embodiment of the invention, a method is provided for retrieving certain electronic information previously stored on certain storage media after a threshold set in the storage retention criteria has been exceeded in an electronic information storage system that stores electronic information on storage media in accordance with a storage retention criteria is provided. The method includes storing a record in a memory associated with a system manager that assigns the storage retention criteria to the certain electronic data, designating the storage media available for overwrite after the threshold set in the storage retention policy has been exceeded, identifying the certain storage media available for overwrite, and retrieving information from the certain media after the threshold set in the storage retention policy has been exceeded.

17 Claims, 4 Drawing Sheets

U.S. PATENT DOCUMENTS

| | | | |
|---|---|---|---|
| 5,287,500 | A | 2/1994 | Stoppani, Jr. |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,448,724 | A | 9/1995 | Hayashi et al. |
| 5,491,810 | A | 2/1996 | Allen |
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,559,957 | A | 9/1996 | Balk |
| 5,619,644 | A | 4/1997 | Crockett et al. |
| 5,638,509 | A | 6/1997 | Dunphy et al. |
| 5,673,381 | A | 9/1997 | Huai et al. |
| 5,699,361 | A | 12/1997 | Ding et al. |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen |
| 5,813,009 | A | 9/1998 | Johnson et al. |
| 5,813,017 | A | 9/1998 | Morris |
| 5,875,478 | A | 2/1999 | Blumenau |
| 5,887,134 | A | 3/1999 | Ebrahim |
| 5,901,327 | A | 5/1999 | Ofek |
| 5,924,102 | A | 7/1999 | Perks |
| 5,950,205 | A | 9/1999 | Aviani, Jr. |
| 5,958,005 | A * | 9/1999 | Thorne et al. ............... 709/202 |
| 5,974,563 | A | 10/1999 | Beeler, Jr. |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem et al. |
| 6,094,416 | A | 7/2000 | Ying |
| 6,131,095 | A | 10/2000 | Low et al. |
| 6,131,190 | A | 10/2000 | Sidwell |
| 6,137,864 | A | 10/2000 | Yaker |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,212,512 | B1 | 4/2001 | Barney et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,328,766 | B1 | 12/2001 | Long |
| 6,330,570 | B1 | 12/2001 | Crighton et al. |
| 6,330,642 | B1 | 12/2001 | Carteau |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,389,432 | B1 | 5/2002 | Pothapragada et al. |
| 6,421,711 | B1 | 7/2002 | Blumenau et al. |
| 6,487,561 | B1 | 11/2002 | Ofek et al. |
| 6,519,679 | B2 | 2/2003 | Devireddy et al. |
| 6,538,669 | B1 | 3/2003 | Lagueux, Jr. et al. |
| 6,564,228 | B1 | 5/2003 | O'Connor |
| 6,658,526 | B2 | 12/2003 | Nguyen et al. |
| 6,789,161 | B1 * | 9/2004 | Blendermann et al. ...... 711/111 |
| 7,103,731 | B2 | 9/2006 | Gibble et al. |
| 7,287,047 | B2 | 10/2007 | Kavuri |
| 2004/0107199 | A1 | 6/2004 | Dalrymple et al. |
| 2005/0033755 | A1 | 2/2005 | Gokhale et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 11/269,521, filed Nov. 7, 2005, Prahlad et al.

\* cited by examiner

SYSTEMS AND METHODS FOR RECOVERING ELECTRONIC INFORMATION FROM A STORAGE MEDIUM

PRIORITY CLAIM

This application claims the benefit of U.S. provisional application No. 60/626,076 titled SYSTEM AND METHOD FOR PERFORMING STORAGE OPERATIONS IN A COMPUTER NETWORK, filed Nov. 8, 2004, and U.S. provisional application No. 60/625,746 titled STORAGE MANAGEMENT SYSTEM filed Nov. 5, 2004, each of which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise expressly reserves all other rights to copyright protection.

RELATED APPLICATIONS

This application is also related to the following patents and pending applications, each of which is hereby incorporated by reference in its entirety:

U.S. Pat. No. 6,418,478, titled PIPELINED HIGH SPEED DATA TRANSFER MECHANISM, issued Jul. 9, 2002;

application Ser. No. 09/610,738, titled MODULAR BACKUP AND RETRIEVAL SYSTEM USED IN CONJUNCTION WITH A STORAGE AREA NETWORK, filed Jul. 6, 2000;

application Ser. No. 09/744,268, titled LOGICAL VIEW AND ACCESS TO PHYSICAL STORAGE IN MODULAR DATA AND STORAGE MANAGEMENT SYSTEM, filed Jan. 30, 2001;

Application Ser. No. 60/409,183, titled DYNAMIC STORAGE DEVICE POOLING IN A COMPUTER SYSTEM, filed Sep. 9, 2002;

application Ser. No. 11/269,520, titled SYSTEM AND METHOD FOR PERFORMING MULTISTREAM STORAGE OPERATIONS, filed Nov. 7, 2005;

application Ser. No. 11/269,512, titled SYSTEM AND METHOD TO SUPPORT SINGLE INSTANCE STORAGE OPERATIONS, filed Nov. 7, 2005;

application Ser. No. 11/269,514, titled METHOD AND SYSTEM OF POOLING STORAGE DEVICES, filed Nov. 7, 2005;

application Ser. No. 11/269,521, titled METHOD AND SYSTEM FOR SELECTIVELY DELETING STORED DATA, filed Nov. 7, 2005;

application Ser. No. 11/269,519, titled METHOD AND SYSTEM FOR GROUPING STORAGE SYSTEM COMPONENTS, filed Nov. 7, 2005; and application Ser. No. 11/269,513, titled METHOD AND SYSTEM FOR MONITORING A STORAGE NETWORK, filed Nov. 7, 2005.

BACKGROUND OF THE INVENTION

The present invention generally relates to the storage and retrieval of electronic data used in computer systems. More particularly, the present invention relates to systems and methods for managing the storage of electronic data on recordable medium that extends the amount of time the electronic data may be retrieved from the recordable medium before the medium is reused in another storage application.

The storage of electronic data has evolved over time. During the early development of the computer, storage of electronic data was limited to individual computers. Electronic data was stored in the Random Access Memory (RAM) or some other storage medium such as a magnetic tape or hard drive that was a part of the computer itself.

Later, with the advent of network computing, the storage of electronic data gradually migrated from the individual computer to stand-alone storage devices accessible via a network. These individual network storage devices soon evolved into networked tape drives, optical libraries, Redundant Arrays of Inexpensive Disks (RAID), CD-ROM jukeboxes, and other devices. Common architectures included drive pools, which generally are logical collections of drives with associated media groups including magnetic tapes or other storage media used by a given drive pool.

Storage systems, such as some of the systems described above, typically employ certain high capacity data storage mediums, which may include magnetic tapes, optical disks and the like to store electronic information. At some point in time, however, it is often no longer necessary or desirable to retain the electronic information stored on these media. When this point is reached, the media on which such electronic information is stored may be reused or recycled by the system for use in other storage jobs rather than simply discarding the media or maintaining the information in perpetuity.

For example, in a tape-based system, a storage tape with unwanted or outdated information may be designated within the storage management system for reuse in a subsequent storage operation in a spare media pool. Such a spare media pool may contain media that is available for storage use in subsequent storage operations and may include new media or media designated for reuse within the storage system. When storage media are assigned to the spare media pool, any information in the storage management system regarding the old data on the tape may be discarded, erased or designated for overwrite and replaced with a simple designation indicating that the tape is available for use in another storage operation. For example, an index entry used by the storage management system that includes information about the old data may be overwritten of renamed to after the data retention period has expired.

In many storage systems, however, the reused storage media continues to contain the data from the previous storage operation, which typically remains on the media until it is overwritten by a new storage process. Thus, in many storage systems, the media designated for reuse continues to contain old information for a significant period of time past any established retention date. Nevertheless, because records are not typically retained or retrievable by storage management systems regarding the media designated for reuse (and any old information contained thereon), it is difficult to recover or restore any of this old information, absent the use of cumbersome, uncommon restore procedures, despite the fact that the such information still exists on media designated for reuse within the system.

Accordingly, what is needed are systems and methods that overcome this and other deficiencies.

SUMMARY OF THE INVENTION

In one embodiment of the invention, a method is provided for retrieving certain electronic information previously stored on certain storage media after a threshold set in the storage retention criteria has been exceeded in an electronic information storage system that stores electronic information on storage media in accordance with a storage retention criteria is provided. The method includes storing a record in a memory associated with a system manager that assigns the storage retention criteria to the certain electronic data, designating the storage media available for overwrite after the threshold set in the storage retention policy has been exceeded, identifying the certain storage media available for overwrite, and retrieving information from the certain media after the threshold set in the storage retention policy has been exceeded.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION

Figure 1:
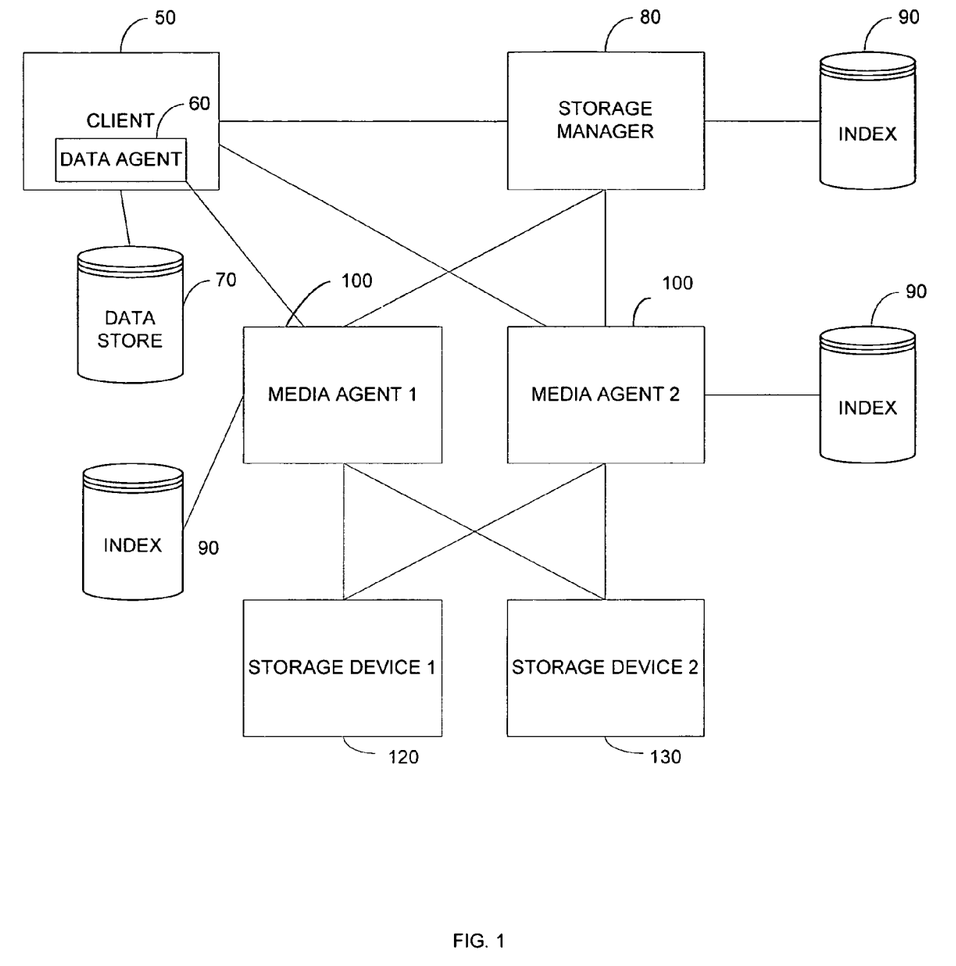
FIG. 1 is a block diagram of a network architecture for a system that performs storage and retrieval operations on electronic data in a computer network in accordance with the principles of the present invention.

An embodiment of the system constructed in accordance with the principles of the present invention is shown in FIG. 1. As shown, the system may include a client 50, a data agent 60, a data store 70, a storage management component (SMC) 80, a storage manager index 90, one or more media management components 100 (sometimes referred to as media agents), one or more media management component indexes 110, and one or more storage devices 120. Although FIG. 1 depicts a system having two media management components 100, there may be one media management component, or a plurality of media management components providing communication between the client 50, storage manager 80 and the storage devices 120. In addition, the system can include one or a plurality of storage devices 120. Moreover, in some embodiments, media management components 100 may be removed, omitted or otherwise bypassed, with storage manager 80 directly controlling storage devices 120.

Client 50 can be any networked client 50 and may include at least one attached data store 70. Data store 70 may be any memory device or local data storage device known in the art, such as a hard drive, CD-ROM drive, tape drive, RAM, or other types of magnetic, optical, digital and/or analog local storage. In some embodiments of the invention, client 50 includes at least one data agent 60, which is a software module that is generally responsible for storing, archiving, migrating, and recovering data of a client 50 stored in data store 70 or other memory location.

Storage operations may include, but are not limited to, creation, storage, retrieval, migration, deletion, and tracking of primary or production volume data, secondary volume data, primary copies, secondary copies, auxiliary copies, snapshot copies, backup copies, incremental copies, differential copies, synthetic copies, HSM copies, archive copies, Information Lifecycle Management ("mM") copies, and other types of copies and versions of electronic data.

In some embodiments of the invention, the system of FIG. 1 provides at least one, and typically a plurality of data agents 60 for each client, each data agent 60 is intended to store, backup, migrate, and recover data associated with a different application. For example, a client 50 may have different individual data agents 60 designed to handle Microsoft Exchange data, Lotus Notes data, Microsoft Windows file system data, Microsoft Active Directory Objects data, and other types of data known in the art.

Storage manager 80 is generally a software module or application that coordinates and controls the system. For example, storage manager 80 may manage and control storage operations performed by the system shown in FIG. 1. Storage manager 80 may communicate with some or all components of the system including clients 20, data agents 60, media management components 100, and storage devices 120 to initiate and manage storage operations. Storage manager 80 may include an index 90 for storing data related to storage operations (described in more detail below). Generally speaking, storage manager 80 communicates with storage devices 120 via a media management component 100. In some embodiments, storage manager 80 may communicate directly with storage devices 120.

The system shown in FIG. 1 may include one or more media management components, such as media management component 100. Media management component 100 may be implemented as a software module that conveys data, as directed by the storage manager 80, between the client 50 and one or more storage devices 120, which can be storage devices such as a tape library, a hard drive, a magnetic media storage device, an optical media storage device, or other storage device. Media management component 100 is communicatively coupled with and may control storage device 120. For example, media management component 100 might instruct a storage device 120 to store, archive, migrate, or restore application specific data. Media management component 100 generally communicates with the storage device 120 via a local bus such as a SCSI adaptor or a host bus adaptor (HBA).

Each media management component 100 may maintain an index cache 110 which stores index data that the system generates during storage operations. For example, storage operations for Microsoft Exchange data generate index data. Index data may include, for example, information regarding the location of the stored data on a particular media (e.g., a location offset value), information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data thus provides the system with an efficient mechanism for performing storage operations including locating user files for recovery operations and for managing and tracking stored data.

The system of FIG. 1 may maintain multiple copies of the index data regarding particular stored data. A first copy may be stored with the data copied to a storage device 120. Thus, a tape may contain the stored data as well as index information related to the stored data. In the event of a system restore, the index data stored with the stored data can be used to rebuild a media management component index 110 or other index useful in performing storage operations. In addition, the media management component 100 that controls the storage operation also may generally write an additional copy of the index data to its index cache 110. The data in the media management component index cache 110 is generally stored on faster media, such as magnetic media, and is thus readily available to the system for use in storage operations and other activities without having to be first retrieved from the storage device 120.

Storage manager 80 may also maintain an index cache 90. Storage manager index data may be used to indicate, track, and associate logical relationships and associations between components of the system, user preferences, management tasks, and other useful data. For example, storage manager 80 might use its index cache 90 to track logical associations between media management components 100 and storage devices 120. Storage manager 80 may also use its index cache 90 to track the status of storage operations to be performed, storage patterns associated with the system components such as media use, storage growth, network bandwidth, service level agreement ("SLA") compliance levels, data protection levels, storage policy information, storage criteria associated with user preferences, retention criteria, storage operation preferences, and other storage-related information.

Index caches 90 and 110 typically reside on their corresponding storage component's hard disk or other fixed storage device. For example, jobs agent 85 of a storage manager component 80 may retrieve storage manager index 90 data regarding a storage policy and storage operation to be performed or scheduled for a particular client 50. Jobs agent 85, either directly or via another system module, may communicate with data agent 60 regarding the storage operation. In some embodiments, jobs agent 85 may also retrieve from index cache 90 a storage policy associated with the client 50 and uses information from the storage policy to communicate to data agent 60 one or more media management components 100 associated with performing storage operations for that particular client 50 as well as other information regarding the storage operation to be performed such as retention criteria, encryption criteria, streaming criteria, etc. Data agent 60 then packages or otherwise manipulates the client data stored in client data store 90 in accordance with the storage policy information and/or according to a user preference, and communicates this client data to the appropriate media management component(s) 100 for processing. Media management component(s) 100 store the data according to storage preferences associated with the storage policy including storing the generated index data with the stored data, as well as storing a copy of the generated index data in the media management component index cache 110. Data may be stored in accordance with any suitable storage policy or preference including those disclosed in U.S. patent application Ser. No. 10/818,749, which is hereby incorporated by reference in its entirety.

In some embodiments, components of the system may reside and execute on the same computer. In some embodiments, a client component such as a data agent 60, a media management component 100, or a storage manager 80 coordinates and directs local archiving, migration, and retrieval application functions as further described in U.S. patent application Ser. No. 09/610,738, which is hereby incorporated by reference in its entirety. These client components can function independently or together with other similar client components.

Figure 2:
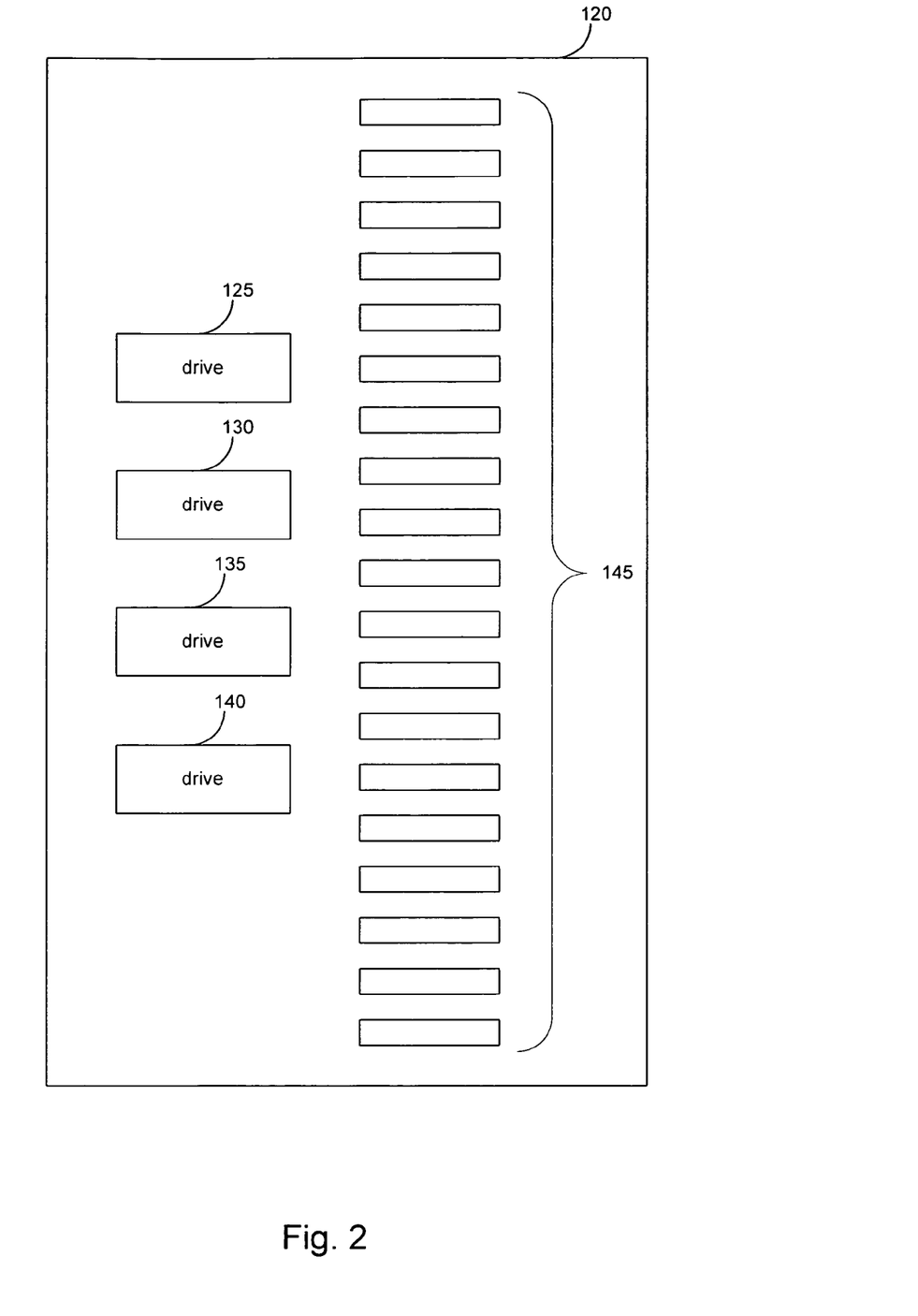
FIG. 2 is a block diagram of an exemplary media library storage device for a system to perform storage and retrieval operations in accordance with an embodiment of the invention.

Storage device 120 may be any conventional storage device capable of storing data. Some storage devices 120 may include a robotic arm (not shown) that may be used to insert and remove storage media 145 contained in the storage device. The type of storage media used in storage device 120 is not critical and can be a magnetic tape or optical disk, such as that generally depicted in FIG. 2. For example, storage device 120 may include any suitable storage media such as storage tapes 145, but some embodiments may also include other optical and magnetic media such as CDRW, DVDRW, etc., (not shown). Storage device 120 may also include drives 125, 130, and 135 for reading information from and writing information to such media. Tapes 145 may store electronic data containing backups of application data, user preferences, system information, and other useful information known in the art.

In operation, the system shown in FIG. 1 may store electronic data on storage media 145 as described above. Generally speaking, the information stored on media 145 may be maintained in accordance with particular storage policy or retention preference that may be predefined or updated periodically. Such policies may be user defined or may be one of several available predefined default settings (e.g., as directed by a storage manager index). A storage policy is generally a data structure or other information that includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

In the case where information is retrieved from media 145, storage manager 80 and/or media management components 100 may cooperate with one another and interact with storage device 120 to locate a particular media 145 and retrieve the desired data. Media 145 may be located using any suitable means including index information that specifies the physical location of the media within storage device 120 and may also utilize external or internal labels or other indicia identifying the media and data stored thereon. Such media identifiers may include on media labels (OMLs), bar codes, RFIDs, etc.

Furthermore, during normal operation, storage device 120 may reuse or recycle storage media 145 as appropriate to provide the system with the storage resources necessary to perform future storage operations and to promote the efficient use of spare media within the system. One benefit of this reuse type system is that it reduces the amount of media required by the storage system thereby eliminating the need for large amounts unnecessary storage media 145.

For example, storage manager 80 and/or media component manager 100 may monitor the retention preferences or storage policies of data stored on media 145. When certain data exceeds one or more predetermined thresholds (e.g., exceeds an age, size or other specified parameter), storage manager 80 and/or media component manager 100 may designate the media on which that data is stored available for current use (i.e., may be overwritten). This allows storage device 120 to use that media, which still contains old data that has passed its retention period, for new storage tasks. For example, after certain data on a particular media 145 has exceeded a threshold parameter, media manager component 100 may designate that media for reuse. The information regarding the old data, however, still exists and may be retained (e.g., in an index or backup index). This information, which may include descriptive metadata, is useful in future restore operations where spare media tape 145 has not yet been overwritten and it is desired to retrieve some of that data stored thereon. Such information may be retained until the media 145 is completely overwritten with new data. After media 145 is overwritten with new data in a subsequent storage operation, the old data previously stored on the overwritten portion of the media is usually unrecoverable.

In some embodiments, media 145 may be managed by assigning the media to one or more "media pools." Media 145 may be assigned to a particular media pool by storage manager 80 based on certain attributes of the data stored on the media. For example, one type of media pool may be referred to as a "save pool." Media assigned to a save pool may be designated by storage manager 80 and/or media management components 100 as "write protected" or "unavailable" or "in storage." Certain media 145 may be assigned to such a save pool in the case where the data stored therein is to remain in storage and accessible pursuant to a storage policy and therefore cannot be overwritten or reused at this point in time. Storage manager 80 may retain records and other information relating to the data stored on each media 145 in the save pool such as its physical location and the relationship between the data, media ID, and storage policy in order to coordinate access and management of storage resources and the stored data.

Another type of media pool may be referred to as a "scratch pool." Media assigned to a scratch pool may be designated by storage manager 80 as "writeable" or "available" or "spare" or "spare media pool." Media assigned to the scratch pool is generally available for storage operations and is generally not write protected or otherwise restricted from use within a storage device. Thus, when the system of FIG. 1 requires additional media 145 for new storage operations, the spare media pool is where such media may be located and made available to the system. Moreover, media 145 may be assigned to such a scratch pool in the case where the media is newly added to the system or where the data stored on a previously used media no longer needs to be retained or has exceeded a limitation set forth in its storage policy and therefore may be overwritten or reused at this point in time. For example, certain data may have exceeded its age criteria. In this case, the media 145 on which that data is stored may be designated for reuse and assigned to the spare media pool. The metadata and other information describing the data may also be retained in a spare media index that tracks such information (not shown). The spare media index may be substantially the similar to or the same as index 90 used to track media 145 and may be stored in or part of index 90.

Thus, the system of FIG. 1 has the ability to keep track of what previously used media is available for new storage operations by consulting an index of data records that indicate which media 145 are members of which media pool. In other embodiments, the status of a particular media may be determined by consulting records that are maintained on a media by media basis. For example, when a certain media is available for new storage operations, a flag may set in that media's profile record. With this system, storage manger 80 may quickly determine system capacity, availability and degree of utilization of spare media.

Moreover, in some embodiments, data may be overwritten on spare media (and the media may be reused) based on a classification scheme or according to certain preferences. For example, data may be assigned to various retention levels and may be overwritten based on those retention levels, with the highest priority data being overwritten last. Thus, for example, low priority data may be overwritten first, intermediate priority data may be overwritten next, and high priority data overwritten last. Such a hierarchy extends the lifecycle of data on a sliding scale, providing additional flexibility in retrieving data based on retention level, while making storage media available within the system.

Unlike prior art systems, a preferred embodiment of the present invention continues to retain records and other information relating to media assigned to the scratch pool (or simply for the media designated for reuse in general irrespective of whether a scratch pool or save pool concept is actually implemented). For example, media management component 100 and/or storage manager 80 may store or retain records relating to each media 145 in the scratch pool including its physical location within storage device 120, the data stored on that media, as well as information useful in indexing that data, media identification information and storage policy, etc. (e.g., in a spare media pool index). This allows the present invention to identify and retrieve previously stored information from scratch pool media that has exceeded its retention date, thus accommodating the need for the reuse of storage media and promoting system efficiency while succeeding in extending the storage period of previously stored data past its retention date by leveraging description data already present within the system This ability represents an improvement over prior art systems which typically cannot access old information from recycled media despite the fact such information continues to remain on spare media within the storage system prior to overwrite.

In some embodiments, the index or other information retained for the scratch pool media (i.e., spare media pool index) may be the same as or substantially similar to the information retained for save pool media. In this case, when a media 145 is assigned to the scratch pool from the save pool, the associated records may be simply copied or redesignated as scratch pool records. Using this approach, little or no additional processing of existing media management information need be performed to obtain detailed and accurate information regarding scratch pool media. The redesignated information may be used by storage manager 80 or other management systems (not shown) to retrieve old information that remains on scratch pool media (prior to reuse).

Although media may be reassigned from one storage pool to the other as described above, it will be understood that this does not necessarily require any physical movement of the storage media from one location to another. Rather, media may remain at one location with that media being reassigned to the scratch pool within management software resident on storage manager 80.

Furthermore, in some embodiments of the invention, storage manager 80 may monitor the reuse of media from the scratch pool such that the system keeps track of the storage space and/or data overwritten by subsequent storage operations. This may involve updating the scratch pool media records so that the records reflect how much of the old data remains on that particular media. For example, a certain media 145 designated for reuse may be partially overwritten such that it includes both new data and old data. This may involve keeping track of certain files, chunks, and/or blocks of data including any location offset on the media or any description. Storage manger 80 may update the records associated with that media so it may be readily determined how much old information still may be recovered. Such updating may be automated and triggered by reuse of a previously used media 145 and/or in accordance with any classification or retention scheme such that description information or metadata may be updated, deleted or otherwise modified when corresponding portions of data are overwritten on media 145. Any suitable data monitoring and updating procedure or program may be used to achieve this objective. This feature permits the present invention to identify and retrieve (or partially retrieve) old information from media already in reuse.

Another aspect of the invention involves the management, organization and display of save pool and scratch pool information. In some embodiments, both save pool and scratch pool information may be organized and displayed using a graphical user interface with familiar pull down menus and a folder/file organization structure. For example, a user may browse information in either pool by merely clicking on a particular folder (such as save or scratch) and select a particular media (which may be represented as a file within the folder) to view the information stored on that particular media. This allows a user media level access to the information stored in the system. In other embodiments, browse features associated with the system may locate and display for a user a graphical view or all save pool media in one display and a different display that shows all the scratch pool media. For example, by searching for all available spare pool media, the system of FIG. 1 may populate a table, list or other graphical display showing the available spare pool media, the records of the data stored on that media, and any other useful information (e.g., a spare pool media display). The same or similar may also be done for save pool media. In some embodiments, access to such information may be password protected within the system and available to only users with the appropriate privileges. For example, a user may only have privileges to the save pool and not the scratch pool, the may have access to high level data such as the available or used media, but not to any index information, etc.

Additionally, management software may include a search engine and command functions that allow the user to quickly search save system media to determine if particular data exists or to observe the status of certain media. For example, if a user wants to determine if certain data which has past its retention cycle still exists on media within the scratch pool, a boolean word search or other searching method may determine whether that data still exists or not. Moreover, the system may generate summaries that include general information such as listing the oldest data in the scratch pool, the current contents of the scratch pool, remaining unused system storage capacity etc. Command functions may allow users to modify or otherwise direct manipulation of media outside of normal automated operation. These summary, command, and search functions may be user configurable and arranged according to the needs or desires of a particular user.

The system of FIG. 1 may select media for reuse employing a number of different selection criteria. For example, media that contains data past its retention cycle may be designated for reuse immediately after (or some time after) the retention period expires. However, the order in which those media are overwritten may vary according to default or user-specified preferences. For example, a default preference may specify that the media containing the oldest data be overwritten first. Other default scenarios may include specifying reuse preference based on data type. For example, all marketing data may be overwritten before any financial data is overwritten, system backup files may have priority over email backups, etc. System users may customize their system with reuse procedures and policies that best reflect the needs of a particular business or enterprise. Nonetheless, it will be understood that any suitable reuse or recycle policy may be used if desired.

Figure 3:
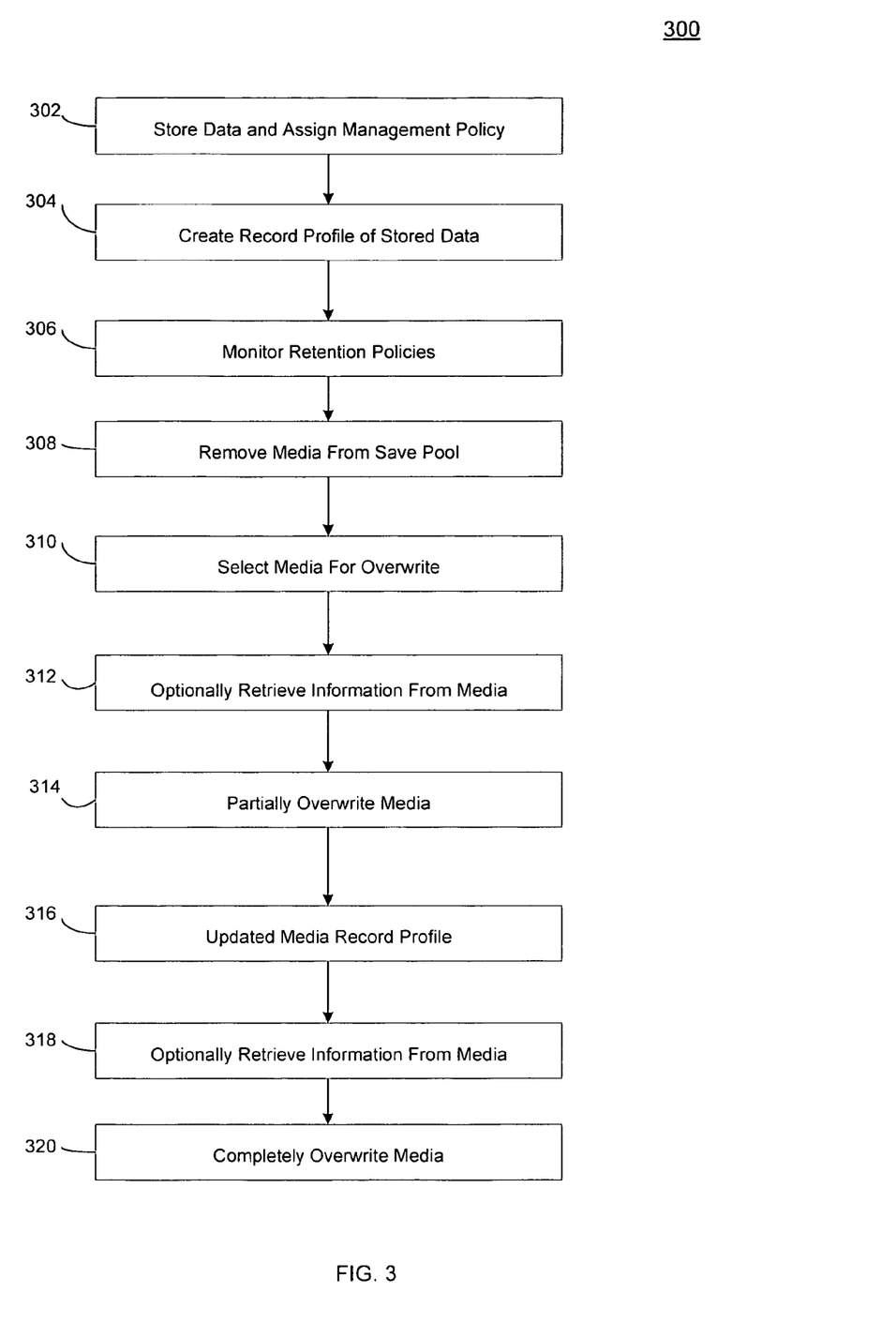
FIG. 3 is a flow chart illustrating some of the steps for performing storage and retrieval operations on electronic data in a computer network according to an embodiment of the invention.

Some of the steps involved in recovering electronic information from a storage medium in accordance with the present invention are illustrated in flow chart 300 shown in FIG. 3. As shown, at step 302, the system of FIG. 1 may determine what data is to be stored, and which retention policy should govern the storage operation. This step is preferably automated and may be accomplished at least in part, by system management software resident on storage manager 80 which oversees the storage of information on a particular media 145. At this point, a certain storage media may be assigned to a save pool and be designated as restricted. After these decisions have been made and the data stored, a record may be created at step 304 that may be maintained in index 90 and/or media management component 100. Next, at step 306, jobs agent 85 or other management agent monitors the retention policies of data stored within the save pool.

At step 308, when certain data exceeds its retention threshold, jobs manager 85 or other selection logic may selectively "prune" or remove certain media from the save pool by releasing its associated index entry and designating it available (i.e., placing it in the scratch pool) while retaining its record profile. Next, at step 310, storage manager 80 and/or media management component 100 may select a media 145 for overwrite based on default of other criteria described above (the "reused media") and update that media's record profile accordingly. At step 312, a user may optionally search for and retrieve information from the reused media assigned to the scratch pool using the indexing and location information stored at step 308. This may be accomplished for example, by invoking the media pool display screen described above, and populating that display with the desired information. A user may then retrieve or otherwise access data stored on the identified media. Afterwards, at step 314, reused media may be partially overwritten in a new storage operation. At this point, the media in use may have record profiles that belong to both the scratch and save pools and both new and old data may be retrieved from the media. For example, a certain media 145 may have index entries in both the save and scratch pool with offset data defining the location of the old or new data on that media. Furthermore, media 145 used in this type of dual role may be organized in any suitable way, as desired, such as by overwriting large contiguous sections, or by selectively overwriting old data of lesser importance, etc. Media 145 containing both old and new information may sometimes be referred to as hybrid media.

Next, at step 316, media management component 100 and/or storage manager 80 may update the record profile or index entry associated with the reused media to reflect the extent to which the reused media has been overwritten and to indicate how much old data still remains. The record profile may also be updated to reflect the newly added information. At step 318, a user may optionally retrieve any old data remaining on the used media, and finally, at step 320 the reused media may be completely overwritten and its associated record profile may be updated to reflect this change. At this point, the reused media may be assigned back to the save pool, and the records in the scratch pool regarding this media may be deleted.

Although the steps shown above are illustrative of a general embodiment of the invention, it will be understood these steps are not intended to be comprehensive or necessarily performed in the order shown. For example, steps 314 to 318 may be performed on an iterative basis until the media in use is completely overwritten or designated to the save pool. For example, steps 314 to 318 may be performed until a threshold is reached, such as media capacity, in which case the index data may be deleted.

Figure 4:
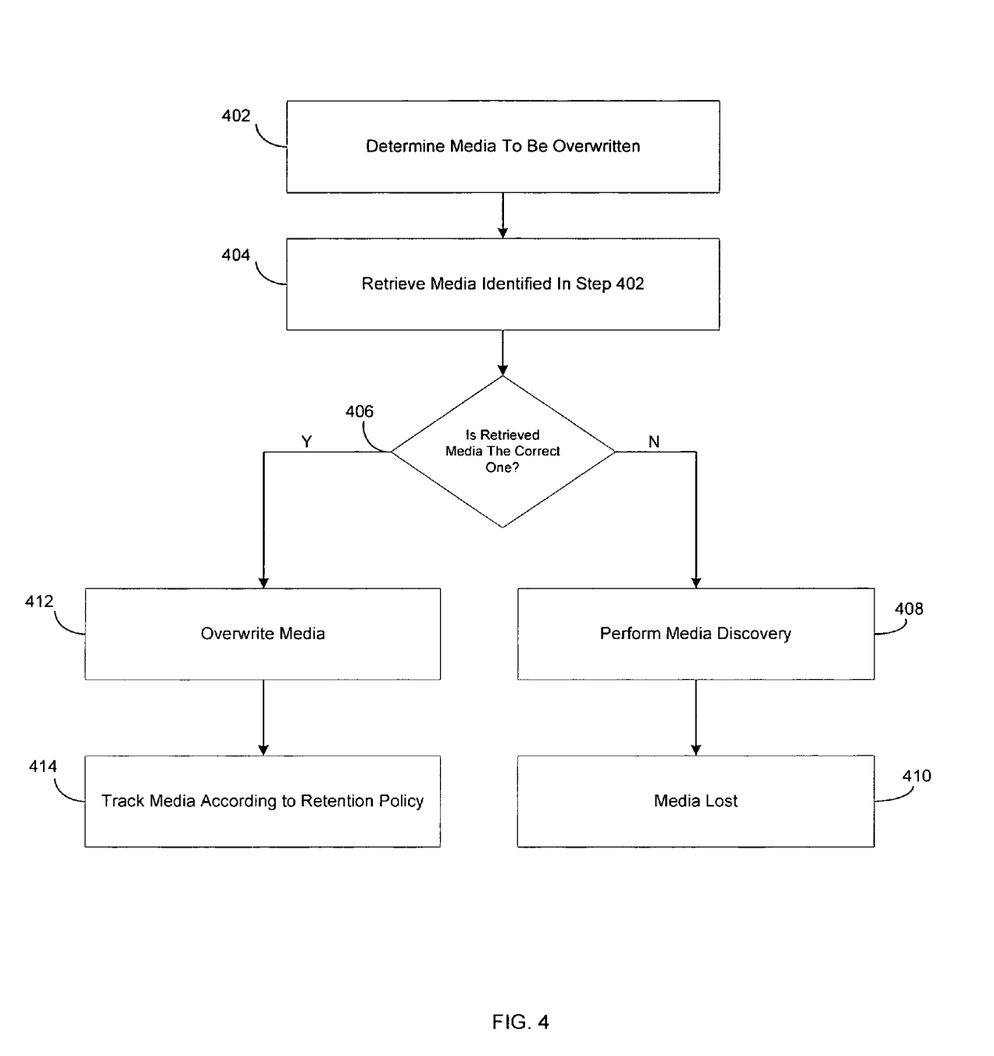
FIG. 4 is a flow chart illustrating some of the steps involved with selecting media for reuse in accordance with an embodiment of the invention.

Some of the steps involved in selecting media assigned to the scratch pool for overwrite in accordance with the present invention are illustrated in flow chart 400 shown in FIG. 4. As shown, at step 402, the system of FIG. 1 may determine what media is to be overwritten first according to certain defined or default criteria as described above. Available media may be tracked in a data structure by storage manager 80 and/or media management component 100 such that the most appropriate media is readily identifiable and available when the need arises for spare media. For example, a data structure representing a virtual queue or other arrangement may be used to track and order media according to retention criteria or other preferences such as first in, first out, by data type or subject matter, etc.

Next, at step 404, a certain media identified in the data structure may be retrieved for an overwrite operation, which would overwrite portions of data previously stored on that media. Storage device 120 may retrieve this media and confirm it is the correct one by verifying its identity via an OML, a header file, or other marking indicia at step 406 to ensure the correct media has been selected for overwrite. If the media identity is verified, the media may be overwritten at step 408 and tracked according to the applicable retention preference or policy at step 410. If the media identity is not verified, the system of FIG. 1 may perform the appropriate discovery steps to locate the media in question at step 412 (e.g., by systematically searching through various media libraries). If the media is located through discovery, the verification procedure may be performed from step 404 going forward. If found, and the media is the correct one, it can continue to on step 408. If not, step 412 may be repeated several times, and if the media is still not found, it may be determined as lost at step 414 (e.g., by a setting flag in the media index profile, or assigning the media to a "lost pool").

Although the steps shown above are illustrative of a general embodiment of the invention, it will be understood these steps are not intended to be comprehensive or necessarily performed in the order shown.

Thus, systems and methods for recovering electronic information from a storage medium are provided. It will be understood that the foregoing is merely illustrative of the principles of the present invention and that various modifications can be made by those skilled in the art without departing from the scope and spirit of the invention. Accordingly, such embodiments will be recognized as within the scope of the present invention.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

Persons skilled in the art will appreciate that the present invention can be practiced by other than the described embodiments, which are presented for purposes of illustration rather than of limitation and that the present invention is limited only by the claims that follow.

What is claimed is:

1. A method for preserving location information related to data stored on removable storage media comprising:
   writing a section of data to a removable storage medium, wherein writing the section of data includes writing the section of data in accordance with a data retention policy that defines a minimum time period in which the section of data cannot be overwritten;
   updating an index associated with the data to include location information related to the section of data that indicates the section of data is stored on a certain portion of the removable storage medium; and
   after the minimum time period lapses,
      designating the certain portion of the removable storage medium that contains the section of data is available for overwrite; and
      deleting the location information related to the section of data from the updated index only after the section of data corresponding to the location information is overwritten.

2. The method of claim 1, further comprising:
   storing the location information related to the section of data to an index separate from the updated index, wherein the index separate from the updated index includes location information related to data that has been partially overwritten.

3. The method of claim 1 wherein the portion of the section of data overwritten is the entire section of data.

4. The method of claim 1, further comprising:
   retrieving, using the location information from the updated index, at least some of the section of data from the removable storage medium after the minimum time period has lapsed.

5. A method of selectively retrieving data from storage media in a storage system comprising:
   storing data on a plurality of storage media pursuant to at least one storage policy;
   retaining the data on the plurality of storage media in accordance with the at least one storage policy;
   designating portions of at least some of the storage media available for overwrite when data stored on the portions of the at least some of the storage media has exceed a threshold established in the storage policy; and
   maintaining records regarding the data that has exceeded the threshold in the storage policy, wherein maintaining records regarding the data that has exceeded the threshold in the storage policy includes preventing erasure of the maintained records before the data that has exceeded the threshold is overwritten.

6. The method of claim 5 further comprising retrieving data from portions of the at least some storage media.

7. The method of claim 5 wherein the storage media available for overwrite are assigned to a spare media pool.

8. The method of claim 7 further comprising displaying on a display screen the storage media assigned to the spare media pool.

9. The method of claim 5 further comprising providing a user interface that allows a user to search the plurality of storage media for data that has exceeded a threshold established in the storage policy and not overwritten.

10. The method of claim 5 further comprising providing a user interface that allows a user to search for and display an indicia regarding the storage media that contains data that has exceeded a threshold established in the storage policy and not overwritten.

11. The method of claim 10 wherein the indicia includes information regarding the physical location of the storage media.

12. The method of claim 5 further comprising preferentially overwriting data stored on the storage media based on data age.

13. The method of claim 5 further comprising preferentially overwriting data stored on the storage media based on data type.

14. The method of claim 5 further comprising preferentially overwriting data stored on the storage media based on user defined criteria.

15. The method of claim 5 further comprising displaying on a display screen the storage media assigned to the save pool.

16. A system for restoring data stored on removable storage media, comprising:
 a data storage component, wherein the data storage component stores data to removable storage media;
 an indexing component, wherein the indexing component creates information related to the storage of the data to the removable storage media;
 a storage policy component, wherein the storage policy component assigns a time period in which to maintain the data stored to the removable storage media; and
 a data restoration component, wherein the data restoration component is configured to use the information related to the storage of the data to the removable storage media (1) to retrieve the data when a time of retrieval is within the time period in which to maintain the data, and (2) to retrieve the data when a time of retrieval is outside of the time period in which to maintain the data but before the data is overwritten; wherein the information related to the storage of the data to the removable storage media is maintained until the data corresponding to the information is overwritten.

17. A method of restoring data stored on a physical storage medium, the method comprising:
 receiving a request to restore data stored on a physical storage medium, wherein the request is received after a time period in which to maintain the data stored on the physical storage medium has expired but before the data stored on the physical storage medium is overwritten;
 locating the physical storage medium that contains the data, wherein locating the physical storage medium includes identifying location information related to the stored data and stored in an index associated with the stored data, wherein the location information related to the stored data is maintained in the index associated with the stored data until the stored data is overwritten; and
 retrieving the stored data from the physical storage medium using the identified location information.

\* \* \* \* \*

UNITED STATES PATENT AND TRADEMARK OFFICE
CERTIFICATE OF CORRECTION

PATENT NO.        : 7,472,238 B1
APPLICATION NO.   : 11/269515
DATED             : December 30, 2008
INVENTOR(S)       : Gokhale et al.

Page 1 of 1

It is certified that error appears in the above-identified patent and that said Letters Patent is hereby corrected as shown below:

Title page, Item (75), Inventors, delete "Chester Springs, PA (US)" and insert -- Acton, MA (US) --, therefor.

In column 4, line 4, delete ""mM")" and insert -- ("ILM") --, therefor.

Signed and Sealed this

Seventeenth Day of March, 2009

JOHN DOLL
*Acting Director of the United States Patent and Trademark Office*